United States Patent
Hamasaki et al.

(10) Patent No.: US 7,314,317 B2
(45) Date of Patent: Jan. 1, 2008

(54) OPTICAL FIBER CONNECTOR AND CONNECTING METHOD

(75) Inventors: Hiroshi Hamasaki, Hiratsuka (JP); Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 162 days.

(21) Appl. No.: 11/049,758

(22) Filed: Feb. 4, 2005

(65) Prior Publication Data

US 2005/0213893 A1    Sep. 29, 2005

(30) Foreign Application Priority Data

Mar. 25, 2004  (JP)  .............. 2004-089300
Mar. 31, 2004  (JP)  .............. 2004-108060
Sep. 30, 2004  (JP)  .............. 2004-287959

(51) Int. Cl.
*G02B 6/38*  (2006.01)

(52) U.S. Cl. ................ 385/62; 385/60; 385/72; 385/78; 385/81

(58) Field of Classification Search ............ 385/60, 385/62, 72, 78, 81
See application file for complete search history.

(56) References Cited

U.S. PATENT DOCUMENTS

| | | | | |
|---|---|---|---|---|
| 4,662,713 | A * | 5/1987 | Davies et al. ............... | 385/73 |
| 4,695,124 | A * | 9/1987 | Himono et al. ............. | 385/78 |
| 4,824,197 | A | 4/1989 | Patterson | |
| 5,013,122 | A * | 5/1991 | Savitsky et al. ............ | 385/81 |
| 5,058,984 | A * | 10/1991 | Bulman et al. ............. | 385/80 |
| 5,214,730 | A * | 5/1993 | Nagasawa et al. .......... | 385/59 |
| 5,363,461 | A * | 11/1994 | Bergmann .................. | 385/78 |
| 5,440,658 | A * | 8/1995 | Savage, Jr. ................. | 385/79 |
| 5,559,917 | A * | 9/1996 | Ott ........................... | 385/86 |
| 6,017,154 | A * | 1/2000 | Carlisle et al. .............. | 385/86 |
| 6,435,728 | B2 * | 8/2002 | Shimoji et al. .............. | 385/56 |
| 6,616,343 | B2 * | 9/2003 | Katsura et al. .............. | 385/55 |

FOREIGN PATENT DOCUMENTS

| | | | |
|---|---|---|---|
| JP | 56052712 A | * | 5/1981 |
| JP | 59160110 A | * | 9/1984 |
| JP | 60-86507 | | 5/1985 |
| JP | 61-252503 | | 11/1986 |
| JP | 64-63905 | | 3/1989 |
| JP | 2-12112 | | 1/1990 |
| JP | 2-111905 | | 4/1990 |
| JP | 4-124606 | | 4/1992 |
| JP | 5-60945 | | 3/1993 |
| JP | 6-138345 | | 5/1994 |
| JP | 9-5557 | | 1/1997 |
| JP | 9-325232 | | 12/1997 |
| JP | 10-123363 | | 5/1998 |
| JP | 2002-228880 | | 8/2002 |
| JP | 3424527 | | 5/2003 |

* cited by examiner

*Primary Examiner*—Michelle R. Connelly-Cushwa
(74) *Attorney, Agent, or Firm*—Oblon, Spivak, McClelland, Maier & Neustadt, P.C.

(57) ABSTRACT

An optical fiber connector is used to optically connect a pair of optical fibers with their tips opposing each other. The optical fiber connector is formed of a material having a higher thermal deformation temperature than the coverings of the optical fibers. The connector has a guide hole for inserting therein the optical fibers with their tips opposing each other. The connector has fiber-fixing groove portions circumferentially formed in the wall of the guide hole. When the coverings of the optical fibers are thermally deformed, parts of the coverings bite the groove portions, whereby the optical fibers are fixed in the guide hole.

20 Claims, 10 Drawing Sheets

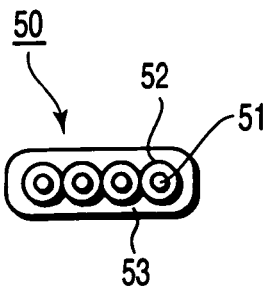
F I G. 12
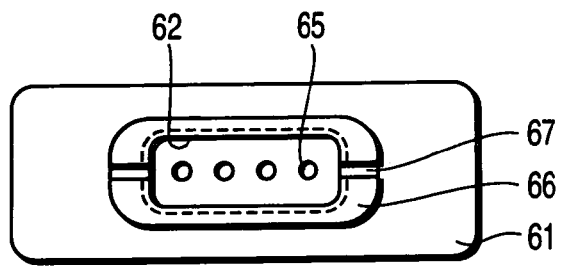
F I G. 13
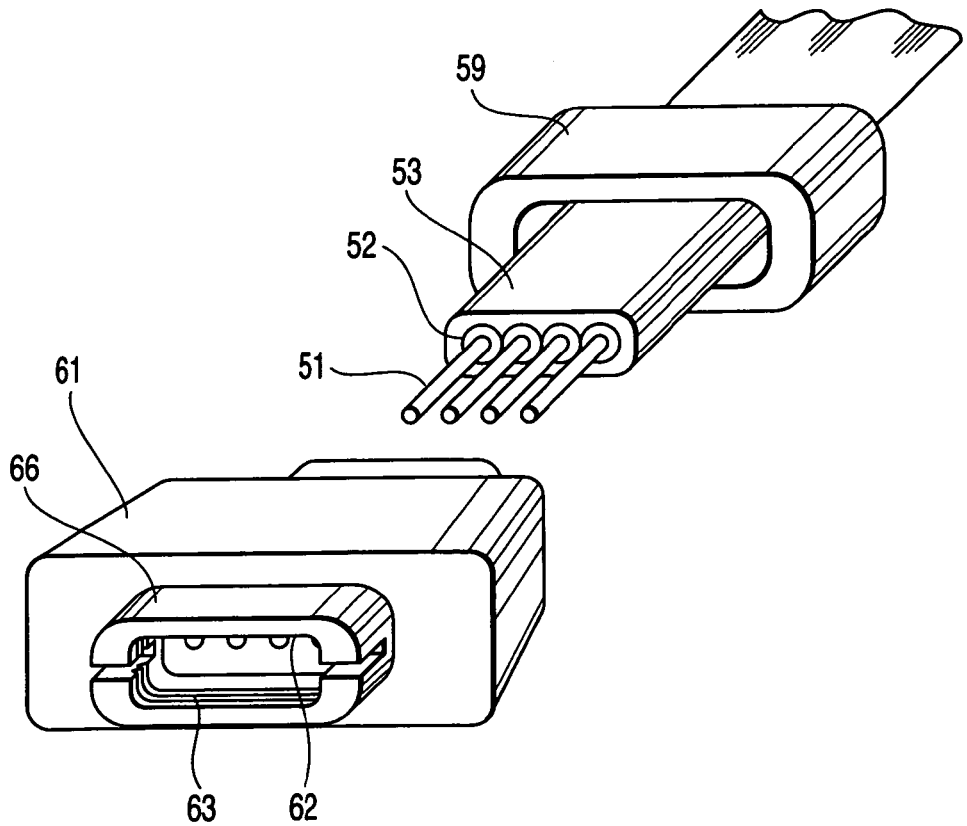
F I G. 14

OPTICAL FIBER CONNECTOR AND CONNECTING METHOD

CROSS-REFERENCE TO RELATED APPLICATIONS

This application is based upon and claims the benefit of priority from prior Japanese Patent Applications No. 2004-089300, filed Mar. 25, 2004; No. 2004-108060, filed Mar. 31, 2004; and No. 2004-287959, filed Sept. 30, 2004, the entire contents of all of which are incorporated herein by reference.

BACKGROUND OF THE INVENTION

1. Field of the Invention

The present invention relates to an optical fiber connector for optically connecting optical fibers, and to an optical fiber connecting method for optically connecting optical fibers using the optical fiber connector.

2. Description of the Related Art

In optical communication and transmission techniques, optical wiring, in which optical transmission lines are formed between LSIs mounted on a board, has recently been developed. In these techniques, the optical transmission lines are formed of, for example, optical fibers or waveguide films. At the present stage, the transmission loss of waveguide films is higher than optical fibers by an order of 3 or 4. Accordingly, to covering a relatively long distance, it is effective to use an optical fiber.

When, for example, LSIs on a board are connected by optical fibers, it is necessary to adjust the lengths of the optical fibers between the LSIs. In this case, it is possible to attach an optical connector to each end of each optical fiber. This is, however, unrealistic since the processing (in particular, polishing) of each end of each optical fiber costs much. Instead, a method called mechanical splicing is effective, in which end faces are formed using stress rupture and no polishing, thereby semi-permanently connecting optical fibers to LSIs.

As a mechanical splicing method, Jpn. Pat. Appln. KOKAI Publication No. 4-124606 discloses a technique for inserting a fiber into a thin tube called a sheath, and crimping the sheath to fix the fiber. Further, Jpn. Pat. Appln. KOKAI Publication No. 2-12112 discloses another mechanical splice method, in which a counter bore for holding an optical fiber is formed in a split sleeve of aluminum, and optical fibers having their end faces formed by stress rupture are made to contact each other in the bore. In this state, the fibers are axially pressed against each other, and the split sleeve is clamped to fix the fibers. This method does not require polishing, and enables optical fibers to be connected on-site using a tool, which does not cost much.

The technique disclosed in Jpn. Pat. Appln. KOKAI Publication No. 4-124606 is disadvantageous in that polishing the connection ends of optical fibers costs much, and in that since each sheath must be crashed, a large tool is needed for it, which makes it difficult to perform connection on-site. Furthermore, since optical fibers are inserted in a sheath and fixed therein, the optical fiber holding portion may be easily displaced by, for example, thermal expansion.

In Jpn. Pat. Appln. KOKAI Publication No. 2-12112, on-site processing is possible. However, since optical fibers contact each other in the aluminum split sleeve, it is necessary to prevent the sleeve from being displaced because of the deformation that occurs when it is clamped. To realize this, it is necessary to increase the strength of the material of the sleeve. This means that it is difficult to form the sleeve of a resin. Further, when the sleeve is formed of a metal, it is inevitably enlarged.

BRIEF SUMMARY OF THE INVENTION

In accordance with a first aspect of the invention, there is provided an optical fiber connector for optically connecting at least one pair of optical fibers covered with covering members, comprising:

a body formed of a resin having a higher thermal deformation temperature than the covering members, the body including a guide hole configured to insert therein the optical fibers with tips thereof being positioned opposing each other, the body including fiber-fixing groove portions circumferentially formed in an inner wall of the body facing to the guide hole to fix the optical fibers together with the covering members In accordance with a second aspect of the invention, there is provided an optical fiber connector for optically connecting at least one pair of optical fibers covered with covering members, comprising:

a body formed of a material having a higher thermal deformation temperature than the covering members, the body including a guide hole configured to insert therein the optical fibers with tips thereof being positioned opposing each other, the body including fiber-fixing groove portions circumferentially formed in an inner wall of the body facing to the guide hole to fix the optical fibers together with the covering members, wherein when the covering members of the optical fibers are thermally deformed, parts of the covering members are bitten by the groove portions, fixing the optical fibers in the guide hole.

In accordance with a third aspect of the invention, there is provided a method for optically connecting at least one pair of optical fibers covered with covering members, comprising:

preparing an optical fiber connector including a body formed of a material having a higher thermal deformation temperature than the covering members, the body including a guide hole configured to insert therein the optical fibers with tips thereof being positioned opposing each other, the body including fiber-fixing groove portions circumferentially formed in an inner wall of the body facing to the guide hole to fix the optical fibers together with the covering members;

exposing end faces of the tips of the optical fibers, inserting, into the guide hole of the optical fiber connector from opposite sides of the guide hole, the at least one pair of optical fibers with optical end faces of the tips of the optical fibers being faced each other; and heating the covering members covering the optical fibers when or after the optical fibers are inserted in the guide hole, to deform thermally the covering members and two bite parts of the covering members into the groove portions to fix the optical fibers in the guide hole.

In accordance with a fourth aspect of the invention, there is provided an optical fiber connector for optically connecting at least one pair of optical fibers, comprising:

a ferrule configured to hold a plurality of optical fibers; and crimping members configured to apply pressure to the ferrule in directions perpendicular and parallel to axes of the optical fibers.

BRIEF DESCRIPTION OF THE SEVERAL VIEWS OF THE DRAWING

FIG. 12 is a schematic sectional view taken along the plane perpendicular to the axes of optical fibers, and useful in explaining the structure of an optical fiber connector according to a sixth embodiment of the invention;

FIG. 13 is a front view useful in explaining the structure of the optical fiber connector of the sixth embodiment, and illustrating a ferrule when it is seen from the axial direction of guide holes;

FIG. 14 is a perspective view useful in explaining the structure of the optical fiber connector of the sixth embodiment, and illustrating how to connect optical fibers;

DETAILED DESCRIPTION OF THE INVENTION

Embodiments of the invention will be described in detail with reference to the accompanying drawings. In the figures, like reference denote like components. However, it should be noted that the figures are schematic ones, and the relationship between thicknesses and plane dimensions, the percentages of the thicknesses of layers, etc., differ from actual ones. Accordingly, the specific thicknesses and dimensions must be determined in consideration of the descriptions below. It is a matter of course that the relationship or ratio in dimensions differs between figures.

In addition, the embodiments described below merely exemplify apparatuses and methods for embodying the technical ideas of the present invention. Therefore, the material, configuration, structure and arrangement, etc., of each structural element are not limited to the specified ones. The technical ideas of the present invention can be modified in various ways without departing from the scope of the claims.

In addition, an optical fiber connector of the embodiment described below cannot be brought back in a state before connection like an optical fiber splice after having connected an optical fiber.

First Embodiment

Figure 1:
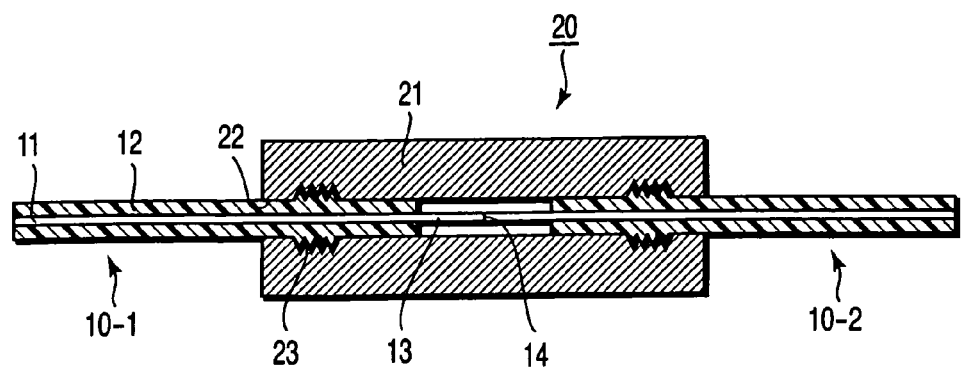
FIG. 1 is a schematic sectional view illustrating the structure of an optical fiber connector according to a first embodiment of the invention.

FIG. 1 is a schematic sectional view illustrating the structure of an optical fiber connector according to a first embodiment of the invention.

In FIG. 1, reference numeral 10 (10-1, 10-2) denotes optical fibers. Each optical fiber 10 is formed by coving a core 11 with a covering 12. The core may be formed of either quartz or plastic. The covering 12 is a primary covering that increases the durability of the fiber to external forces such as a bending force and rubbing force. The covering 12 may be formed of a single layer or a plurality of layers made of a UV cured resin, soft plastic, polyamide resin, etc.

After part of the covering 12 is removed from an end portion of each optical fiber 10 (FIG. 13 shows those end portions of the optical fibers 10 from which the covering 12 is removed), the end face of each optical fiber 12 is formed using stress rupture. In this state, the optical fibers 10 are inserted, from both sides, into the guide hole of a ferrule described later, whereby the end faces of the optical fibers contact each other.

In FIG. 1, reference numeral 20 denotes an optical fiber connector. The optical fiber connector 20 is formed of a cylindrical ferrule (connector body) 21 that comprises a positioning guide hole 22 and fiber-fixing groove portions 23 provided in the inner surface of the guide hole 22.

The ferrule 21 may be made of a metal such as aluminum, a ceramic material such as zirconia, glass, epoxy resin, polyphenylene sulfide (PPS) resin, polyethylene terephthalate (PBT) resin, phenol resin, polyester resin, polyimide resin, fluorocarbon resin or liquid crystal polymer, etc. It is sufficient if the heat-resistance temperature (in this case, the lowest temperature at which the bending elasticity coefficient of each material is half or less that at room temperature) is higher than the temperature at which the covering 12 of the optical fiber 10 is thermally deformed. In particular, if the ferrule is formed of epoxy resin mixed with 70 to 80% glass filler of about 5 to 30 μm thickness, the guide hole 22 can be easily formed by resin molding using a metal mold.

The guide hole 22 extends through the center of the ferrule 21 in the axial direction of the ferrule, and has an inner diameter greater by 1 to 2 μm than the outer diameter of the optical fibers 10. The groove portions 23 are provided at positions near the opposite ends of the guide hole 22. Each groove portion 23 has a plurality of grooves having a V-shaped cross section, formed in the inner surface of the guide hole 22, and extending circumferentially.

Figure 2A:
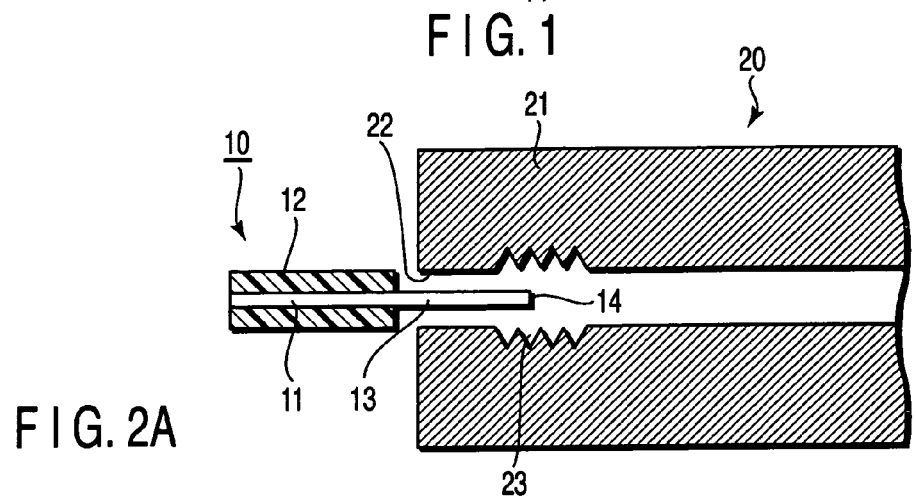
FIGS. 2A to 2C are sectional views useful in explaining a method for connecting optical fibers, according to the first embodiment.
Figure 2B:
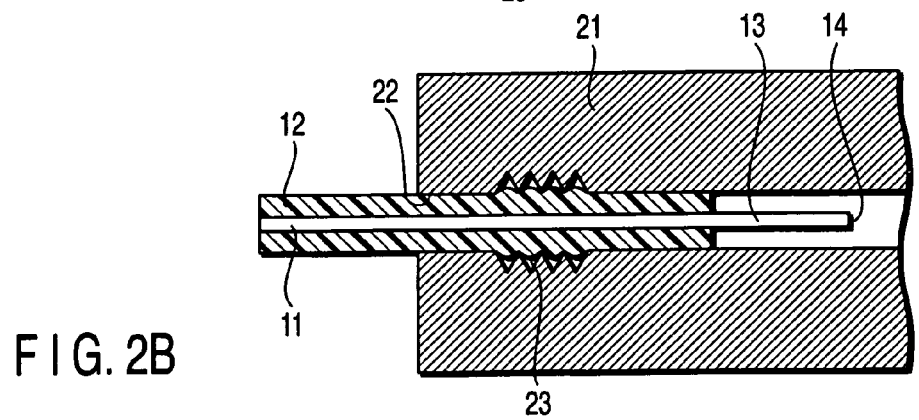
Figure 2C:
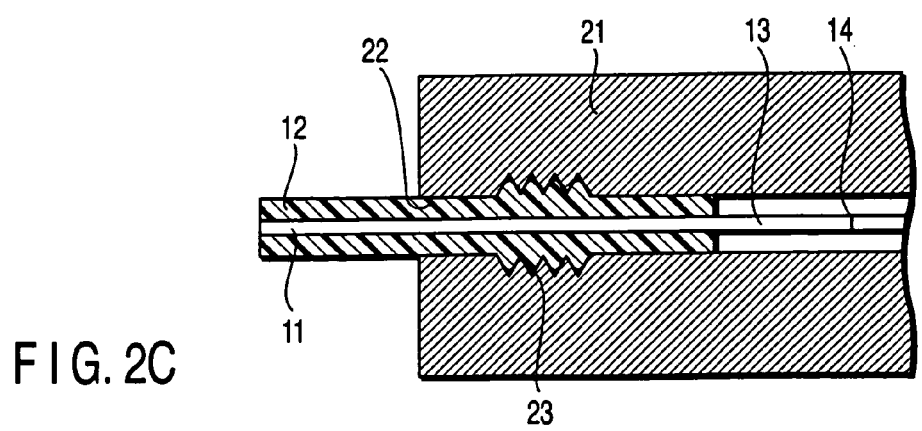

FIGS. 2A to 2C are sectional views useful in explaining a method for connecting optical fibers, according to the first embodiment.

As shown in FIG. 2A, the covering 12 is removed from an end portion 13 of each optical fiber 10, thereby forming an optical input/output end face 14. The end face 14 is formed by, for example, stress rupture, and serves as an optical end face. The guide hole 22 of the ferrule 21 has a diameter of, e.g., 1 μm, which is slightly greater than that of each optical fiber 10. The guide hole 22 has groove portions 23 formed in the inner surface thereof so that they do not project from the inner surface.

As shown in FIG. 2B, one of the optical fibers 10 having end faces formed is inserted into the guide hole 22. At this time, part of the covering 12 of the inserted optical fiber 10 is held by one of the groove portions 23. In this state, the other optical fiber 10 is inserted into the hole 22 from the opposite side, so that the end faces 14 of the optical fibers 10 contact each other. In this state, the optical fibers 10 are kept pressed against each other from the outside.

In this state, the resultant assembly is heated, whereby the covering 12 of each optical fiber is thermally expanded to substantially fill the corresponding groove portion 23 as shown in FIG. 2C. Thus, the optical fibers 10 are fixed with their end faces kept in tight contact with each other.

If the inner diameter of the groove portions 23 is larger than the outer diameter of the coverings 12 of the optical fibers 10, the optical fibers 10 can be inserted more smoothly. However, the covering 12 of the inserted optical fiber 10 is not held by the groove portion 23 as shown in FIG. 2B. In this case, in the following process, the other optical fiber 10 is inserted, and both the inserted optical fibers 10 are heated and pressed against each other. As a result, a force is exerted on the coverings 12 to push them into the connector, whereby parts of the coverings 12 are deformed and fill the groove portions 23 as shown in FIG. 2C. Where the inner diameter of the groove portions 23 is larger than the outer diameter of the coverings 12, the fibers 10 can be inserted smoothly, and hence the fiber end faces can be made to contact each other in a reliable manner.

The inner diameter of the groove portion 23 means the inner diameter of the innermost peripheral edge of the groove portion, and is identical to the diameter of the guide hole 22. If the smoothness of insertion of the optical fibers 10 may be reduced, the inner diameter of the groove portions 23 can be reduced to more reliably hold the optical fibers.

Figure 3:
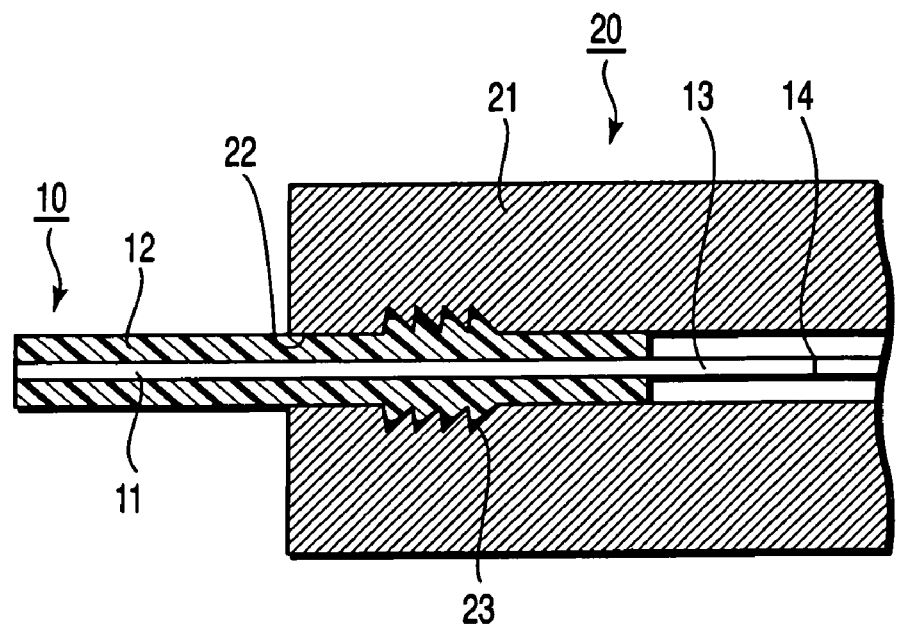
FIG. 3 is a sectional view illustrating a groove configuration employed in a modification of the first embodiment.

FIG. 3 is a sectional view illustrating a modification of the groove portion 23. In this modification, the groove portion 23 has a serrated cross section. The portion of each groove located close to the center of the ferrule gently inclines to the optical axis, and the opposite portion (outside portion) forms a steep slope having a normal line with respect to the optical axis. The groove portion 23 of this shape exhibits a low resistance to the optical fiber 10 when the fiber is inserted. Further, after thermal deformation, the groove portion 23 exhibits a kickback effect, i.e., exhibits a high resistance, in the direction in which the optical fiber 10 comes out of the ferrule.

Thus, in this modification, when optical fibers 10 are inserted into the ferrule 21 from the opposite ends of the positioning guide hole 22 formed in the ferrule 21 and having the fiber fixing grooves 23 in the inner surface thereof, the coverings 12 of the optical fibers 10 are thermally deformed to make part of the coverings 12 be bitten by the groove portion 23 to fix the optical fiber 10. As a result, only the axial force is exerted on the contact portions of the optical fibers 10, i.e., the optical connection, and no radial force is exerted thereon.

Accordingly, it is not necessary to form the connector 20 of a rigid material in order to prevent initial positional displacement of the optical fibers 10. The connector 20 can also be formed of a resin. This widens the selection range of materials, and enables a low-cost compact connector to be provided. Further, since it is sufficient if the coverings 12 are heated to a thermally deformable temperature, on-site processing can be realized relatively easily. Moreover, no other components are needed, which further reduces the required cost and size.

Second Embodiment

Figure 4:
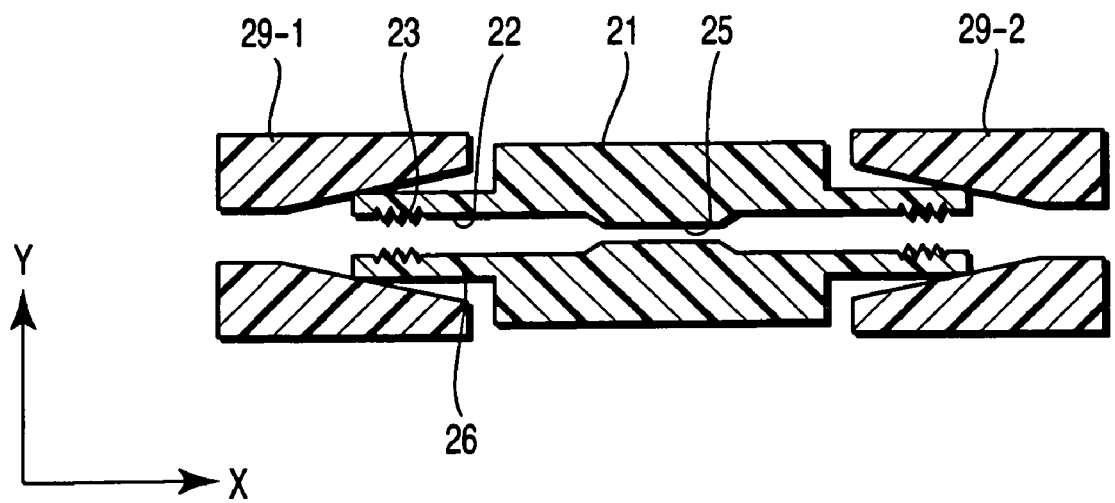
FIG. 4 is a schematic sectional view illustrating the structure of an optical fiber connector according to a second embodiment of the invention.

FIG. 4 is a schematic sectional view illustrating the structure of an optical fiber connector according to a second embodiment of the invention.

In FIG. 4, reference numeral 21 denotes a ferrule (connector main body), which is formed with installing the hole axially of the column body. The ferrule 21 can be formed of epoxy resin, polyphenylene sulfide (PPS) resin, polyethylene terephthalate (PBT) resin, phenol resin, polyester resin, polyimide resin or fluorocarbon resin, etc. In particular, it is preferable to form the ferrule 21 of epoxy resin mixed with about 80% glass filler of about 30 μm thickness. In this case, the ferrule 21 can be easily formed by resin molding using a metal mold. The ferrule 21 includes holding portions 26 formed by thinning the opposite ends. Each holding portion 26 has an uneven portion (groove portion) 23 formed in the inner surface of a guide hole 22 that is formed in the portion 26. When the ferrule 21 holds optical fibers 10, the uneven portions 23 bite the coverings 12 of the fibers 10 to thereby prevent the fiber from being displaced in the X-axis direction in FIG. 4. Further, the guide hole 22 is narrowed at the center of the ferrule 21, and this narrow portion serves as an optical fiber guide 25.

When a cylindrical crimping member 29-1 is fitted onto the ferrule 21 in the positive direction of the X-axis, and a cylindrical crimping member 29-2 is fitted onto the ferrule 21 in the negative direction of the X-axis, the holding portions 26 are inwardly deformed. This structure rigidly fixes the optical fibers 10 inserted in the ferrule 21.

At this time, such a strong force as deforms the ferrule 21 does not exerted on the portion of the ferrule at which the end faces of the optical fibers contact each other. Therefore, even if the ferrule 21 is formed of a deformable material such as a resin, the end faces of the optical fibers are free from deformation, which means that the upper limit of connection loss can be defined substantially as initially designed.

Figure 5:
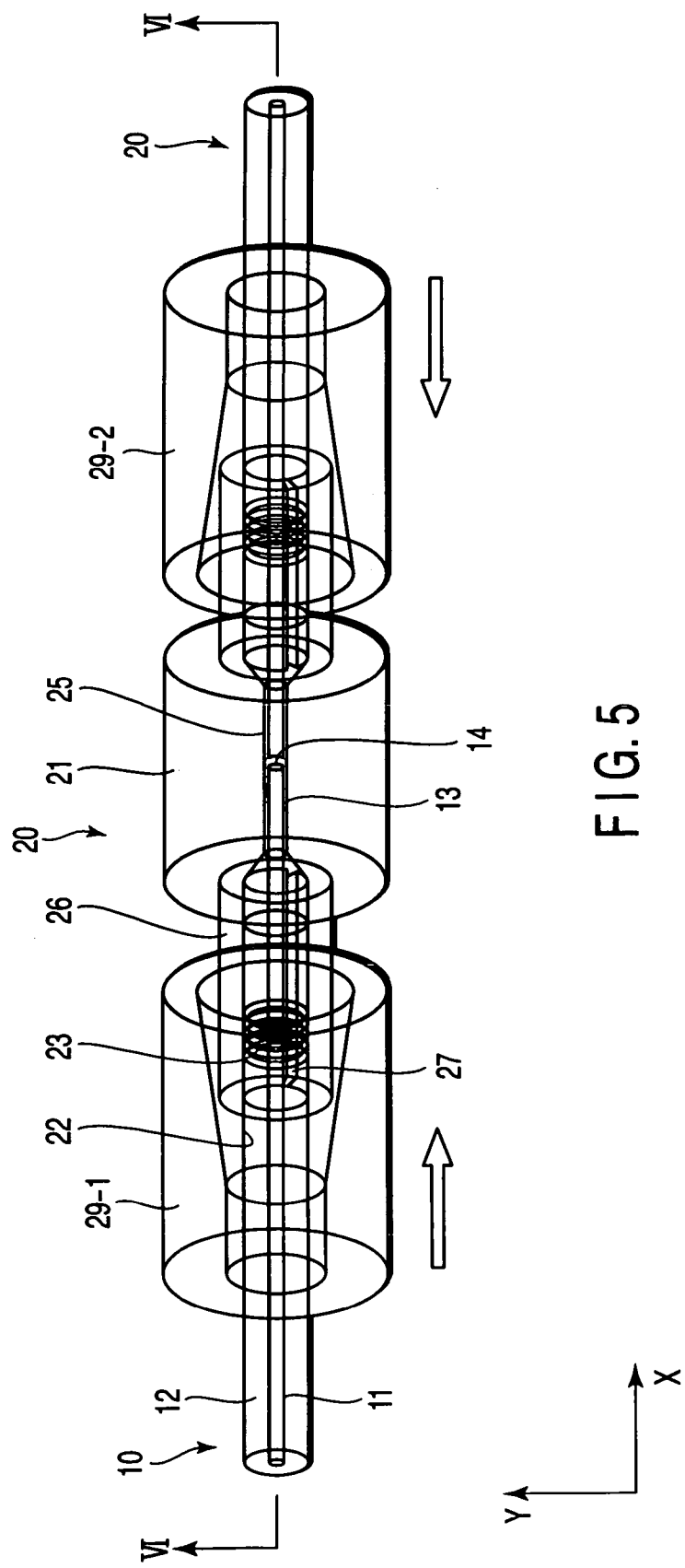
FIG. 5 is a schematic perspective view illustrating the structure of the optical fiber connector of the second embodiment.
Figure 6:
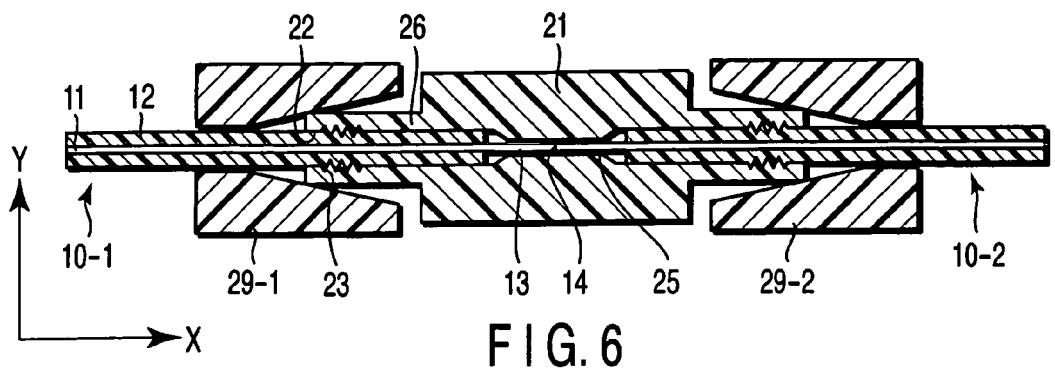
FIG. 6 is a view taken along line VI-VI in FIG. 5.

FIG. 5 is a perspective view illustrating a state of optical fibers actually connected by the optical fiber connector of the second embodiment. FIG. 6 is a view taken along line VI-VI in FIG. 5. FIGS. 5 and 6 are views of an example of a single-fiber connector, and show a state assumed immediately before the crimping members 29 (29-1, 29-2) crimp the coverings 12 of the optical fibers 10. In the figures, reference numeral 27 denotes an axial slit formed in each holding portion 26 of the ferrule 21, and each holding portion 26 is in the form of a split sleeve. When the crimping members 29 are inwardly pushed as indicated by the arrows, the inner diameter of the holding portions 26 is reduced, and the uneven portions 23 bite the coverings 12.

The optical fibers 10 shown in FIG. 5 may be a quartz-based fiber used for, for example, optical communication, or a plastic-based fiber (POF) used for vehicle control systems. The optical fibers 10 are each acquired by covering a core 11 with the covering 12. The covering 12 must have durability to external forces such as such as a bending force and rubbing force. The covering 12 may be formed of a single layer or a plurality of layers made of a UV cured resin, soft plastic or polyamide resin, etc.

The respective end portions 13 of the optical fibers 10 are not covered with the coverings 12, and have their optical end faces 14 formed by stress rupture. The optical fibers 10 are inserted into the guide hole 22 of the ferrule 21 in the positive and negative directions of the X-axis, and accordingly, the end faces 14 of the cores 11 are inserted into the optical fiber guide 25 in the positive and negative directions of the X-axis. As a result, the end faces 14 are brought into contact with each other. The inner diameter of the guide hole 22 is larger by about 1 to 2 μm than the outer diameter of the optical fibers 10, while the inner diameter of the optical fiber guide 25 is slightly larger than the core diameter of the optical fibers 10.

When the crimping members 29-1 and 29-2 are fitted onto the optical fibers 10 in the positive and negative directions of the X-axis, respectively, the holding portions 26 of the ferrule 21 are inwardly deformed to fix the fibers. To this end, the crimping members 29 have tapered inner surfaces, and the holding portions 26 of the ferrule 21 have respective slits 27, as is shown in FIG. 5. The crimping members 29 may be formed of a resin or metal. However, to reduce the cost, it is preferable to use a resin as the material of the members 29. The ferrule 21 may be formed of the same materials as the crimping members 29. Further, the uneven portions 23 bites the coverings 12 to more reliably secure the optical fibers 10.

In the optical fiber connector of the second embodiment, even if there is a slight gap between the end faces of the optical fibers 10, no serious problem will occur. In this case, there is a tendency for loss and/or reflection of an optical signal to slightly increase, but it is sufficient if the system is designed in light of this tendency.

The above structure of the second embodiment enables the mechanism for holding the optical fibers 10 to be realized by a deformation mechanism such as crimping members 29, therefore enables the connector itself to be formed of a resin, i.e., to be formed at low cost.

Figure 7A:
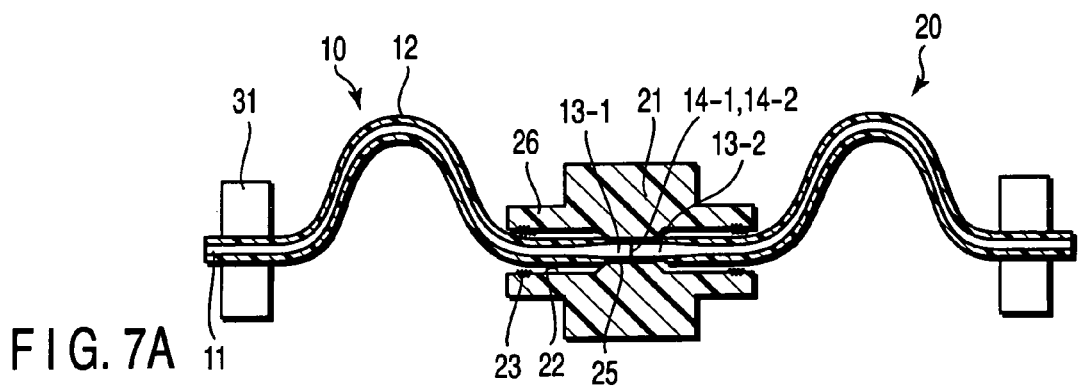
FIGS. 7A to 7C are sectional views useful in explaining a method for connecting optical fibers, according to the second embodiment.
Figure 7B:
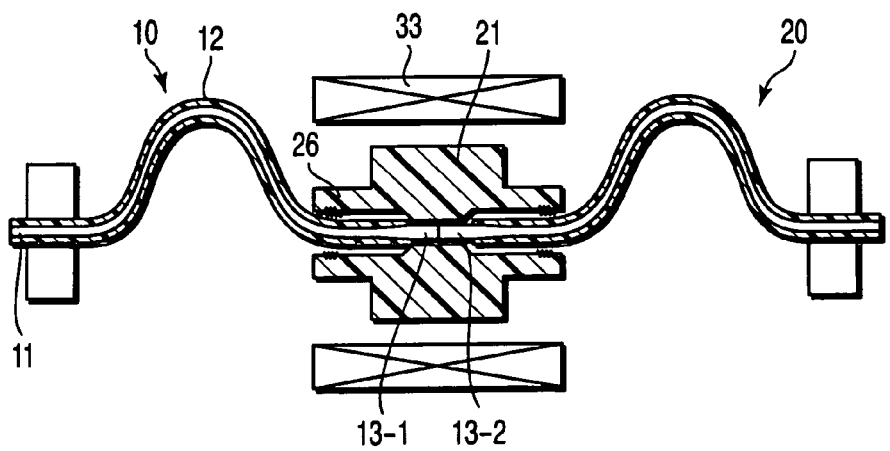
Figure 7C:
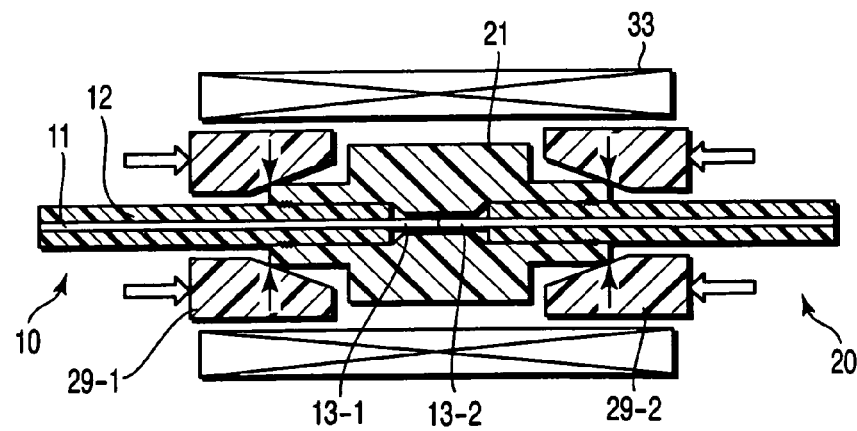

Using the above-described optical fiber connector, a pair of optical fibers are connected in the following manner. FIGS. 7A to 7C are sectional views useful in explaining a method for connecting optical fibers, according to the second embodiment.

Firstly, after portions of the coverings 12 are removed from the respective optical fibers 10, the exposed portions resulting from the removal are cut by, for example, stress rupture to provide exposed optical end faces 14-1 and 14-2.

Subsequently, as shown in FIG. 7A, one of the optical fibers 10, i.e., optical fiber 10-1, is inserted into the guide hole 22 of the ferrule 21 from one side, with its optical end face headed. After that, the exposed core 11 of the optical fiber 10-1 is inserted into the optical fiber guide 25. In this state, the optical fiber 10 is kept warped by an external holding mechanism 31. The other optical fiber 10-2 is inserted into the guide hole 22 of the ferrule 21 from the other side. Thereafter, the end faces of the optical fibers 10-1 and 10-2 are brought into contact with each other, and the optical fibers 10-1 and 10-2 are kept warped with pressure.

After that, as shown in FIG. 7B, the portion of the ferrule 21 about the holding portions 26 is heated by a heater 33, and then the crimping members 29-1 and 29-2 beforehand fitted on the optical fibers 10-1 and 10-2 are inwardly pushed in the positive and negative directions of the X-axis, respectively, as shown in FIG. 7C. As a result, the width of each slit 27 is narrowed to reduce the inner diameter of the corresponding holding portion 26, whereby the uneven portions 23 bite the coverings 12 (see the arrows in FIG. 7C). At this time, if the temperature of the holding portions 26 is increased to a value higher than the softening temperature of the coverings 12 in the heating process shown in FIG. 7B, the uneven portions 23 can more deeply bite the coverings 12. If the portion other than the holding portions 26, such as the optical fiber guide 25, is not heated, deformation of the optical fiber guide 25 is suppressed. After that, the heater 33 is removed to cool the entire connector to room temperature, with the result that the coverings 12 are hardened to serve as an adhesive for fixing the optical fibers 10-1 and 10-2.

During a series of processes, the optical fiber guide 25 is prevented from extra forces and/or heat, which enables optical fiber connection to be realized by a simple structure, with the optical connection of the optical fibers 10-1 and 10-2 maintained.

Third Embodiment

Figure 8:
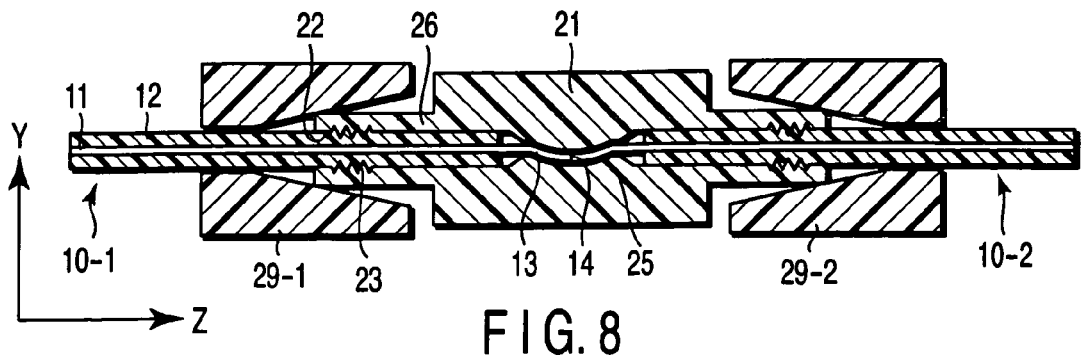
FIG. 8 is a schematic sectional view illustrating the structure of an optical fiber connector according to a third embodiment of the invention.

Referring then to FIG. 8, a third embodiment of the invention will be described. The third embodiment differs from the second embodiment in that in the former, the optical fiber guide 25 is not cylindrical but curved.

In this structure, when the end faces 14 of the optical fibers 10-1 and 10-2 contact each other, residual stress occurs in the X-axis direction because of the buckling force of the optical fibers themselves. This residual stress continues to urge the end faces 14 and holds the optical connection. Furthermore, since the optical fibers 10-1 and 10-2 are guided along one of the curved walls of the optical fiber guide 25, they are directed in the same direction (downwards or upwards), therefore radial displacement of the outer peripheries of the coverings of the fibers can be minimized when the fibers contact each other. In other words, the optical fibers can be aligned highly accurately.

Fourth Embodiment

Figure 9:
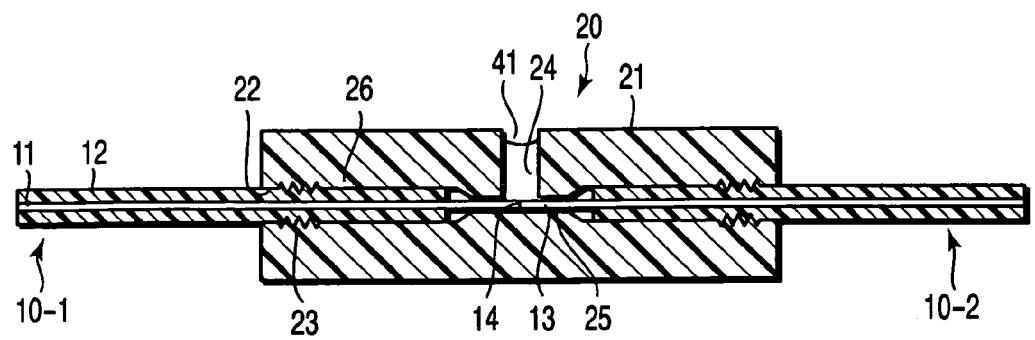
FIG. 9 is a schematic sectional view illustrating the structure of an optical fiber connector according to a fourth embodiment of the invention.

Referring then to FIG. 9, a fourth embodiment of the invention will be described.

The fourth embodiment differs from the first embodiment in that in the former, the ferrule 21 has an adhesive injection hole 24 for receiving a transparent adhesive serving as a refractive-index matching agent. The ferrule 21 has an optical fiber guide 25 and holding portion 26 as in the second embodiment, and the adhesive injection hole 24 is formed in the holding portion 26 from its surface to the radially central portion. Further, the diameter of the optical fiber guide is smaller than the diameter of the guide hole 22 of the holding portion 26, as in the second embodiment.

In the optical fiber connecting method employed in the first and second embodiments, the ferrule 21 is cooled down to room temperature after it is heated. Therefore, the optical fiber guide 25 itself may be deformed in accordance with the deformation of the ferrule 21, whereby the end faces 14 of the optical fibers 10-1 and 10-2 may be misaligned or become out of contact. In contrast, in the fourth embodiment where a refractive-index-matching agent as a transparent adhesive 41 is injected through the adhesive injection hole 24 shown in FIG. 9, an abrupt change in refractive index due to the misalignment or out-of-contact state, and reflection at the end faces resulting from the abrupt change in refractive index can be avoided.

In addition, the joint of the optical fibers 10 and its vicinity are fixed by the transparent adhesive 41. When the adhesive 41 and ferrule 21 are formed of a resin, the end faces of the optical fibers 10 may well be misaligned with each other to a degree corresponding to the difference between the inner diameter of the ferrule and the outer diameter of the fibers. Further, there may be a case where a slight gap occurs between the end faces. It is a mater of course that the system must be designed in light of the fact that such misalignment or gap may well increase an optical signal loss or reflection. Since the transparent adhesive 41 also serves as a refractive-index-matching agent, it can significantly reduce the reflection of light.

The above structure enables the mechanism for holding the optical fibers 10 to be placed away from the end faces 14 of the fibers 10. This being so, the holding portions are positioned separately from the joint of the optical fibers 10. This structure enables the holding mechanism to be realized by a mechanically deformable mechanism, such as a contact fitting mechanism, without displacing the fiber optical connection portions (=the fiber end faces) from each other. Accordingly, the required components can be formed of, for example, a resin, which means that they can be formed at low cost. Furthermore, after fitting the optical fibers into the ferrule to make optical connection, the transparent adhesive 41 is hardened around the joint of the fibers to provide a sufficient mechanical strength.

FIGS. 10A to 10D are sectional views illustrating a method for connecting optical fibers employed in the fourth embodiment.

After part of the covering 12 is removed to expose the end portion of one optical fiber 10, the end face of the fiber 10, which will serve as an optical end face, is exposed by, for example, stress rupture. The exposed-end-face side of the optical fiber 10 is inserted into the guide hole 22 of the ferrule 21, and the optical fiber 10 is kept warped by an external holding mechanism 31. Similarly, the other optical fiber 10 is inserted into the guide hole 22 of the ferrule 21 from the other side. Thereafter, the end faces of the optical fibers 10 are brought into contact with each other, and the optical fibers 10 are kept warped with pressure (see FIG. 10A).

Figure 10A:
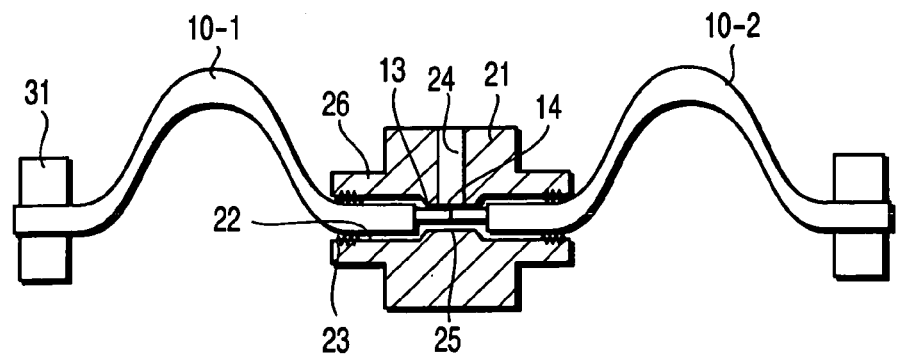
FIGS. 10A to 10D are sectional views useful in explaining a method for connecting optical fibers, according to the fourth embodiment.
Figure 10B:
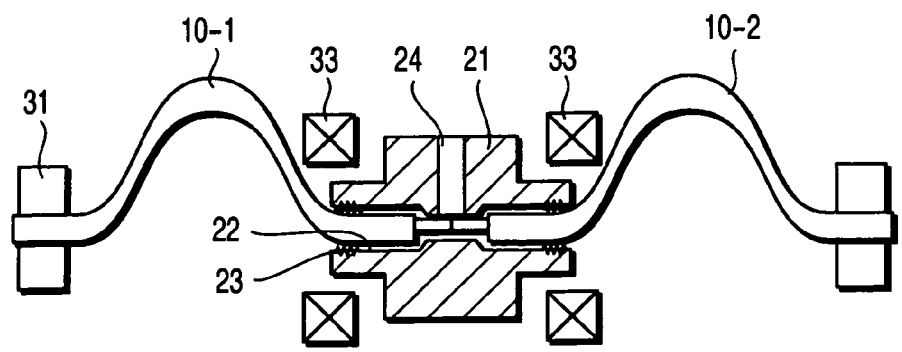
Figure 10C:
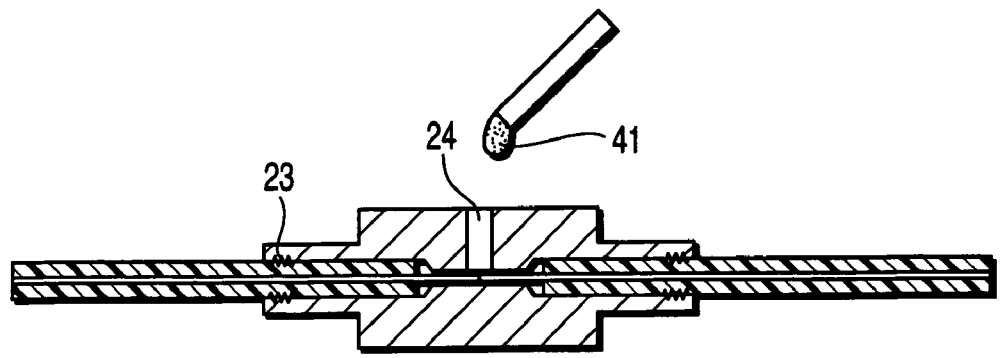
Figure 10D:
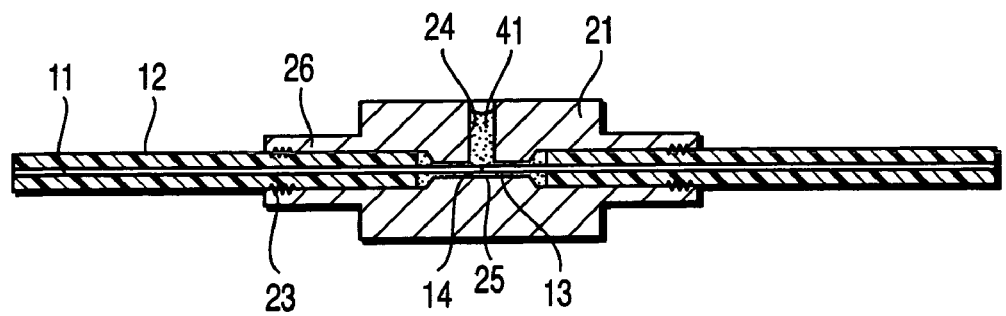

After that, the external holding mechanism 31 is removed, and the transparent adhesive 41 is injected through the injection hole 24 into the ferrule around the joint of the optical fibers 10 (see FIG. 10C). Then, the transparent adhesive 41 is hardened to completely fix the joint and its vicinity (see FIG. 10D).

Thus, the optical fibers can be connected, with to-be-optically-connected portions correctly aligned with each other.

Fifth Embodiment

Figure 11:
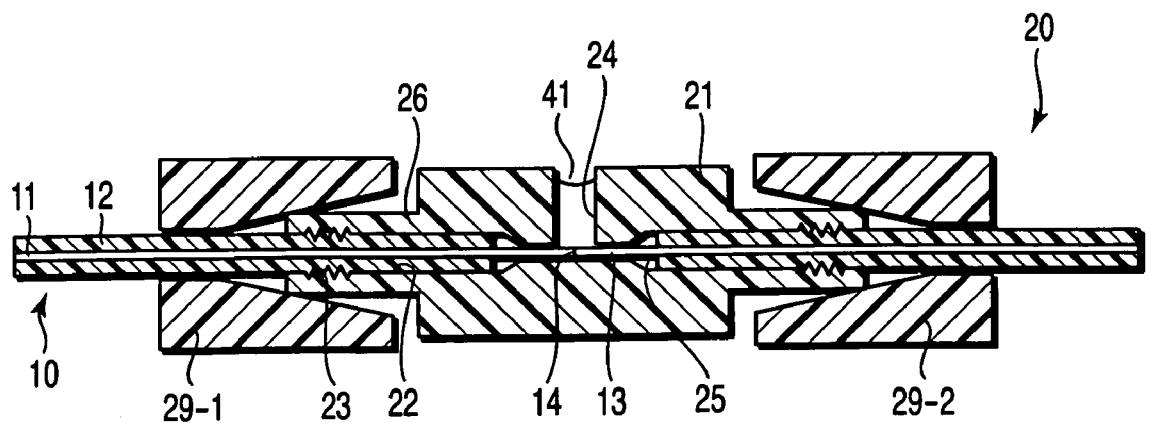
FIG. 11 is a schematic sectional view illustrating the structure of an optical fiber connector according to a fifth embodiment of the invention.

Referring now to FIG. 11, a fifth embodiment of the invention will be described. This embodiment is acquired by adding crimping members 29 (29-1, 29-2) to the fourth embodiment.

In the fifth embodiment, external crimping members 29 are prepared for assisting the deformation fitting of the coverings 12, and are left where they are even after connection is completed. As shown in FIG. 11, each crimping member 29 has a tapered inner-diameter portion. When the crimping members 29 are slid along the axes of the optical fibers 10, the holding portions 26 are inwardly deformed and crimped. The crimping members 29 may be formed of a resin or metal. To reduce the cost, it is preferable to form the members 29 of a resin. In this case, the same resin as that of the ferrule can be used.

The manufacturing process in the fifth embodiment is almost identical to that shown in FIGS. 10A to 10D except that the caulking members 29 are used. Specifically, in the deformation step shown in FIG. 10B, the crimping members 29 beforehand fitted on the optical fibers are pressed against the holding portions from both sides to make the groove portions 23 bite the coverings 12. As a result, deformation fitting is further reliably performed. Moreover, the effect of crimping is maintained by leaving the fixed crimping members 29 where they are, thereby further enhancing the reliability of the connector.

Sixth Embodiment

Referring to FIGS. 12 to 14, a sixth embodiment of the invention will be described. The first to fifth embodiments employ single-core optical fibers, while the sixth embodiment employs a plurality of optical fiber arrays.

FIG. 12 is a sectional view illustrating a plane perpendicular to the axis of an optical fiber. In FIG. 12, reference numeral 51 denotes a core, reference numeral 52 a primary covering, and reference numeral 53 a secondary covering. Four optical fibers each formed by covering the core 51 with the covering 52 are covered with the secondary covering 53, thereby providing an optical fiber array 50. This structure is called a tape fiber formed of a plurality of optical fibers (core+primary covering) gathered in the shape of a ribbon.

FIG. 13 is a front view of a ferrule 61, employed in the sixth embodiment, when viewed in the direction of the axis of the guide hole. Reference numeral 66 denotes a holding portion acquired by narrowing each end of the ferrule 61. Slits 67 are formed in each holding portion 66. Further, reference numeral 62 denotes a guide hole for inserting therein the optical fiber array 50, and reference numeral 65 guide holes (optical fiber guides) for inserting therein the cores 51 of the optical fiber array 50.

FIG. 14 is a perspective view illustrating a state in which an optical fiber is connected by the optical fiber connector of the sixth embodiment. As in the first embodiment, a groove portion 63 for fixing a fiber is formed near the opening of the guide hole 62. Further, as in the first embodiment, the optical fiber array 50 is inserted into the guide hole 62 after its optical end faces are exposed. The cores 51 are inserted into the respective optical fiber guides 65 and fixed therein. At this time, the resultant structure is subjected to a heat treatment, thereby thermally deforming the secondary covering 53 of the optical fiber array 50 to hold the array 50 by the groove portion 63. Further, a crimping member may be used to realize more reliable fixing. For facilitating explanation, FIG. 14 shows only one optical fiber array 50. It is a matter of course that another optical fiber array is inserted at the opposite position.

Seventh Embodiment

A seventh embodiment is directed to an apparatus and method for forming the end faces of an optical fiber using stress rupture, which are used in each of the above-described embodiments.

Japanese Patent No. 3424527, for example, discloses an apparatus for automatically removing the covering of an optical fiber and forming its end face for performing end-face forming using stress rupture. In the disclosed method, after the covering of an optical fiber is removed, the optical fiber with no covering is fixed by upper and lower clamps. After that, a cut-forming blade is slid to form a cut in the optical fiber. A chock unit is pressed against the cut to thereby cut the fiber and form an end face thereof. Since the optical fiber is fixed by the upper and lower clamps when it is cut, the cutting pressure and the depth of the resultant cut can be accurately controlled. Accordingly, a substantially perpendicular end face can be formed, which means that an excellent optical end face can be acquired.

However, in the above-described apparatus for treating a connection end of an optical fiber, it is necessary to clamp a fiber after its covering is removed, which means that the length (which is called "extra length") of a to-be-removed covering must be set to a value sufficient for the clamps to clamp the fiber. Thus, a long extra length is needed.

A similar method is disclosed in "Development of Automatic Optical Fiber Cutter for Highly Rigid Connection" written on pages 9-182 of the '86 National Convention Document of the Institute of Electronics and Communication Engineers of Japan. In this method, a cut is formed in an optical fiber without removing its covering, and the covering is removed from the fiber after cutting the fiber. Since the covering is thus removed after cutting, the fiber can be cut near its end. Therefore, a desired length of covering can be cut after cutting, which enhances the efficiency of use.

In this method, however, a cut must be formed in the fiber with its covering on. Accordingly, it is necessary to increase the cutting pressure, which means that a large cut may well be formed and cut size may well vary. This makes it difficult to smooth the optical fiber end face after cutting, and may cause diffused reflection on the end face. Furthermore, since cut size is very liable to vary in the initial cutting stage, it is necessary to impart, during forming a cut, an axial tensile force to the right and left portions of the fiber with respect to the cut. This makes the cutter structure complex, resulting in an increase in size and cost.

In contrast, the seventh embodiment provides an optical-fiber-cutting apparatus which can minimize the extra length of the covering of an optical fiber at low cost, and can be made compact, and an optical-fiber-cutting method used in the apparatus.

Figure 15:
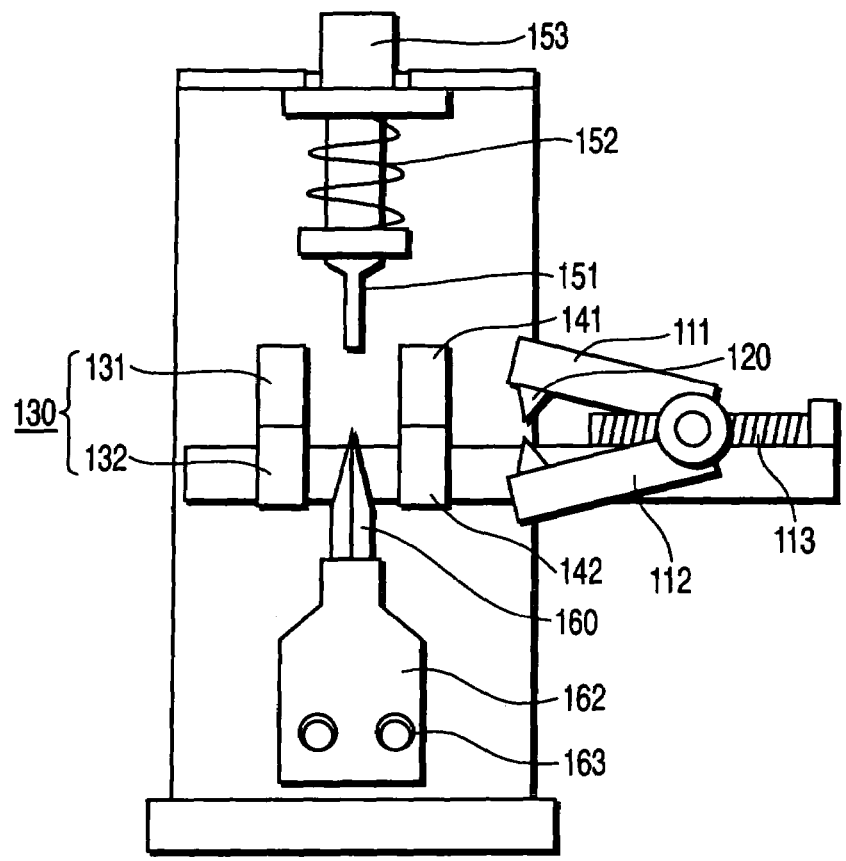
FIG. 15 is a schematic view illustrating the entire structure of an optical fiber manufacturing apparatus according to a seventh embodiment of the invention.
Figure 16:
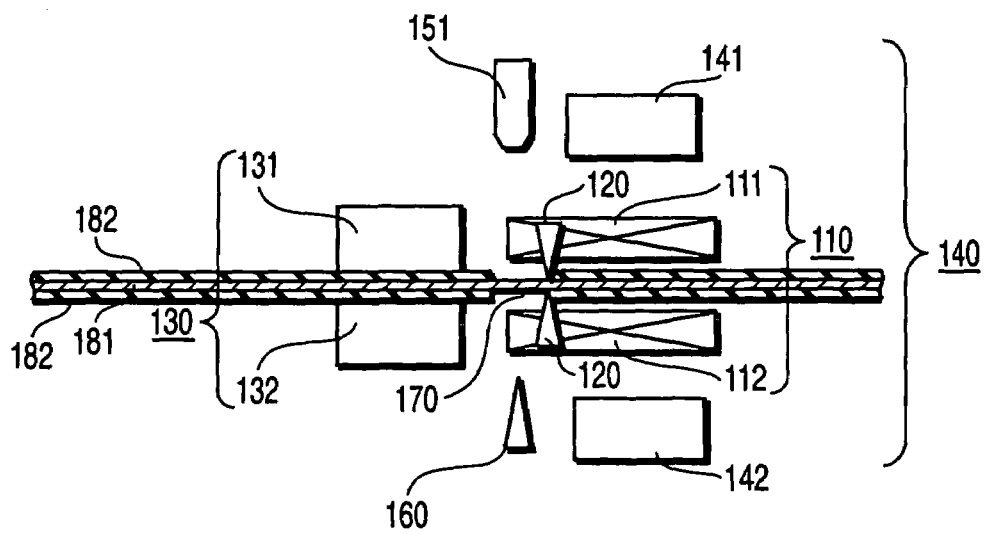
FIG. 16 is a sectional view illustrating an essential part of FIG. 15.

FIGS. 15 and 16 are views useful in explaining an essential part of the optical-fiber-cutting apparatus according to the seventh embodiment. Specifically, FIG. 15 is a schematic view, and FIG. 16 is a sectional view.

In the figures, reference numeral 131 denotes an upper clamp, and reference numeral 132 denotes a lower clamp. The upper and lower clamps provide a first clamp 130. The clamp 130 clamps an optical fiber together with its covering. The first clamp 130 is formed of a soft material, such as rubber or soft plastic, which does not damage optical fibers. The first clamp 130 holds an optical fiber with a certain pressure so that the fiber does not move when an axial force is applied to the fiber to remove its covering or cut it.

A stripper 110 is formed of blade supports 111 and 112 coupled so that they can pivot about a fulcrum. The blade supports 111 and 112 contain respective heaters for heating, to about 80-120° C., blades 120 mounted on the blade supports 111 and 112 to enable the covering of an optical fiber to be easily removed. The blades 120 are formed of a material, such as stainless steel or aluminum alloy, which has a high hardness and durability. The entire stripper 110 can be slid rightward and leftward in FIG. 15 by a movement screw 113.

After the blades 120 is made to bite portions of the covering 182 of an optical fiber 181 up to a depth immediately before they reach the fiber 181, the stripper 110 is moved away from the cutting region of the fiber 181 (i.e., moved rightward in FIG. 15), thereby peeling part of the covering 182. Reference numeral 170 in FIG. 16 denotes an exposed portion of the optical fiber 181 from which the covering 182 is removed by the stripper 110. The "part of the covering" is an extremely narrow portion with an axial length of about 2 mm, which includes the to-be-cut portion of the fiber 181. Further, the "part of the covering" does not include the portion of the optical fiber 181 clamped by a second clamp, described later. After the peeling operation, the blade supports 111 and 112 are largely opened upward and downward, respectively, and can be retracted rightward in FIG. 15.

A second clamp 140 comprises an upper clamp 141 and lower clamp 142. When the stripper 110 operates, the upper and lower clamps 141 and 142 are largely opened upward and downward, respectively, and positioned in their retracted positions. The stripper 110 is arranged so that the blades 120 are retracted rightward in FIG. 15 when the covering of the optical fiber is removed by a predetermined interval (which should be sufficient to prevent the optical fiber from being cut together with the covering), for example, about 2 mm in the axial direction. After the stripper 110 is retracted, the clamps 141 and 142 fix the optical fiber together with the removed portion of the covering.

A cut-forming blade 160 is formed of a WC-based super-hard alloy or sintered diamond, etc., and secured via rails 163 to a blade-holder 162 vertically movable in FIG. 15. When the cut-forming blade 160 moves vertically in accordance with the movement of the blade-holder 162, it forms a fine cut in the optical fiber. When a chock unit 151 formed of hard rubber or soft plastic is pressed against the cut of the optical fiber, the optical fiber is cut by plastic rupture. Reference numeral 152 denotes a spring for releasing the chock unit, and reference numeral 153 denotes a button for operating the chock unit. By pushing the button 163, the chock unit 151 is downwardly pressed against the optical fiber to cut it by plastic rupture. To cut the optical fiber by plastic rupture, the first and second clamps 130 and 140 must be separate from each other by a certain distance.

In the optical-fiber cutting apparatus of the seventh embodiment, since the covering is clamped, it is sufficient if the width of a portion of the optical fiber 181 exposed by removing the covering 182 is set to a value that permits the cut-forming blade 160 to form a cut in the fiber. Accordingly, the length of the exposed portion of the optical fiber 181, from which the covering 181 is removed after cutting the fiber 181 by plastic rupture, can be minimized, which enables a fiber connection to be made compact by, for example, splicing. Further, if, for example, a tape core wire, in which a plurality of optical fibers are covered with a secondary covering, is cut, it is cut with the to-be-removed covering left, therefore the fibers are prevented from being separated from each other. Thus, the handleability of the tap core wire is enhanced, and dust cleaning, for example, after cutting can be performed easily.

Referring then to FIGS. 17A to 17E, a description will be given of an optical-fiber-cutting method using the above optical-fiber-cutting apparatus.

Figure 17A:
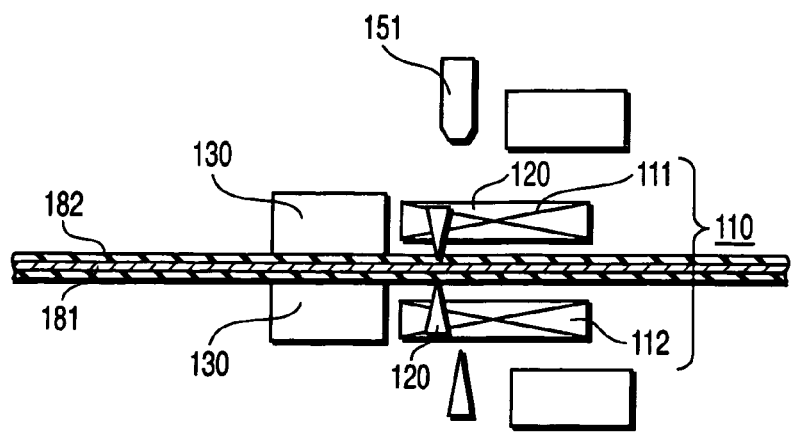
FIGS. 17A to 17E are sectional views illustrating the process of manufacturing the optical fiber according to the seventh embodiment.

Firstly, as shown in FIG. 17A, the first clamp 130 clamps the optical fiber 181 together with the covering 182, and then the blades 120 of the stripper 110 are made to bite portions of the covering 182.

Figure 17B:
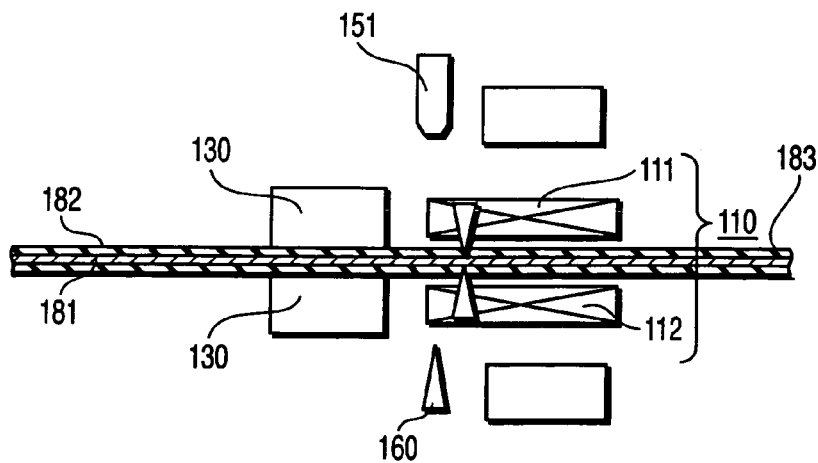

Subsequently, as shown in FIG. 17B, the stripper 110 is moved toward the end of the optical fiber 181 (rightward in FIG. 17B), thereby removing part of the covering 182. Reference numeral 170 denotes the portion of the optical fiber 181 that is exposed by removing the covering 182. Reference numeral 183 denotes the removed part of the covering 182.

Figure 17C:
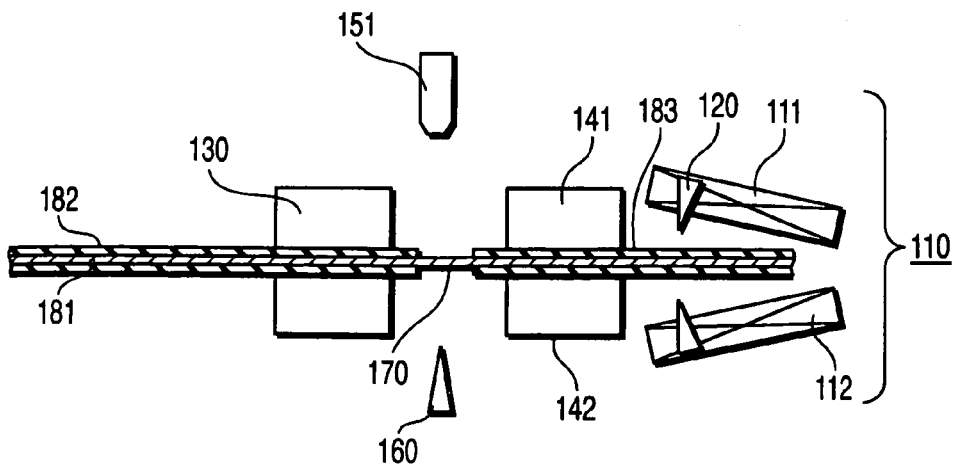

After that, as shown in FIG. 17C, when the exposed portion 170 reaches a predetermined position, the blade supports 111 and 112 of the stripper 110 are largely opened vertically, thereby retracting the stripper 110 rightward in FIG. 17C along the optical fiber 181. Thereafter, the second clamp 140 clamps the optical fiber 181 together with the removed covering 183. At this time, the second clamp 140 must be away from the first clamp 130 by a distance that enables the optical fiber 181 to be warped and cut by plastic rupture. In the seventh embodiment, the distance is set to about 10 mm.

Figure 17D:
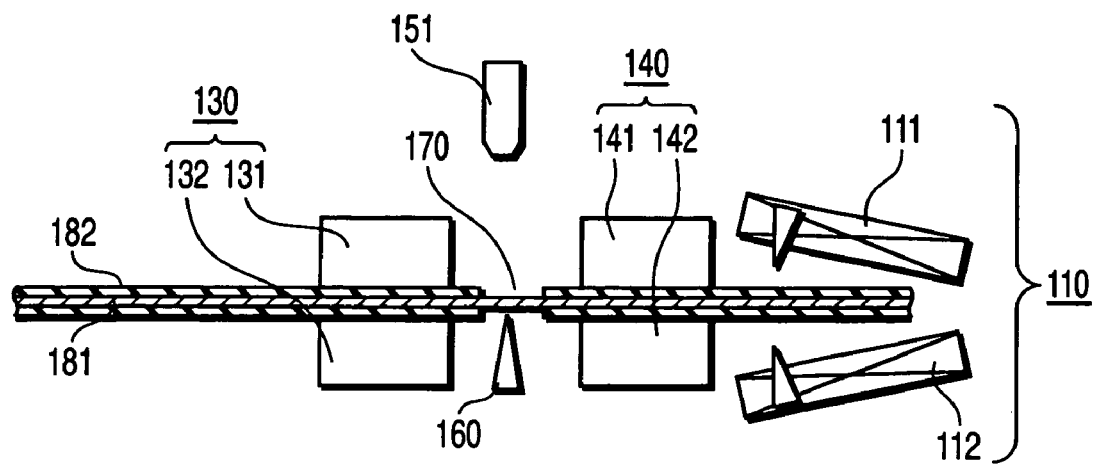

Subsequently, as shown in FIG. 17D, the cut-forming blade 160 is brought into contact with the exposed portion 170 of the optical fiber 181, thereby forming a fine cut in the optical fiber 181 (in the embodiment, a cut with a depth of about 5-10 μm is formed).

Figure 17E:
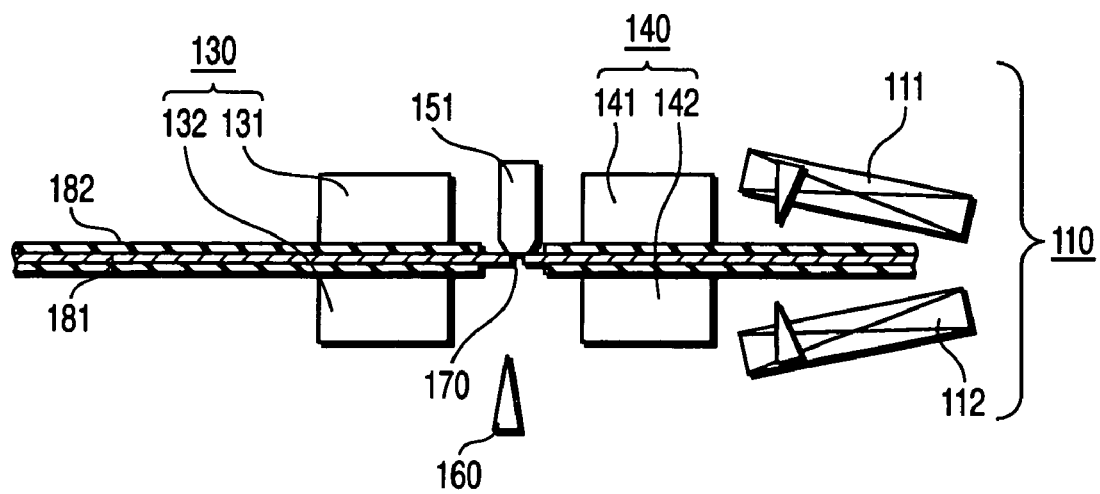

Lastly, as shown in FIG. 17E, the chock unit 150 is downwardly pressed against the exposed portion 170 of the optical fiber 181, thereby cutting the fiber by plastic rupture.

The manufacturing method of this embodiment is characterized in that when the covering 182 is removed by the stripper 110, a portion of the covering 182 needed for cutting the fiber 182 is left, and the fiber 181 is cut with the fiber 181 and the left portion of the covering 182 clamped by the second clamp 140. AS a result, the extra length of the covering needed for forming an end face of the optical fiber can be minimized. It is sufficient if the length of the exposed portion 170 is set to a value that enables the cut-forming blade 160 to tough the optical fiber. This length can be set to about 2 mm. In this case, if a cut is formed in the middle portion of the exposed portion 170, the length of the exposed portion of the fiber after cutting can be made to be an extremely small value of about 1 mm, which is half the length of the exposed portion 170. Accordingly, if optical fibers produced by the apparatus of the seventh embodiment are connected, the required connector size can be reduced.

As described above, after the covering near the optical-fiber cut region is removed by the stripper, the stripper is detached from the optical fiber. Therefore, the extra length of the optical fiber can be minimized at low cost, compared to the method of moving the stripper along the axis of the optical fiber instead of detaching it. Further, after the covering is removed, a cut is formed in the surface of the optical fiber and then the fiber is cut by plastic rupture, which enables a highly reliable, compact cutting-apparatus to be produced.

(Modification)

The above-described embodiments simply exemplify the apparatuses or methods for embodying the technical idea of the present invention, and this technical idea is not limited to the materials, shapes, structures, arrangements disclosed in the embodiments. The present invention can be modified in various ways without departing its scope.

For example, the shapes of the ferrules or crimping members employed in the embodiments are not limited to the coaxial ones, but may have other shapes such as a parallel-plate-type shape. Furthermore, the groove portion is not limited to the coaxial grooves, but may be formed of dimples arranged circumferentially.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical fiber connector for optically connecting at least one pair of optical fibers covered with covering members, comprising:
    a body formed of a resin having a higher thermal deformation temperature than the covering members, the body including a guide hole configured to insert therein the optical fibers with tips thereof being positioned opposing each other, the body including fiber-fixing groove portions circumferentially formed in an inner wall of the body facing to the guide hole to fix the optical fibers together with the covering members; and
    crimping members fitted on ends of the body which are in an axial direction of the guide hole, the crimping members being configured to press the optical fibers from outside, and the crimping members having tapered inner surfaces.

2. The optical fiber connector according to claim 1, wherein the body includes an adhesive injection hole configured to inject therethrough a transparent adhesive to clearance around the tips of the optical fibers.

3. The optical fiber connector according to claim 2, wherein the transparent adhesive is an refractive index matching agent with the refractive index of the optical fibers.

4. The optical fiber connector according to claim 1, wherein the groove portions have an inner diameter not more than an outer diameter of the covering members covering the optical fibers.

5. The optical fiber connector according to claim 1, wherein the groove portions include grooves each having a V-shaped cross section in an axial direction of the guide hole, one side of the V-shaped cross section located close to a center of the body inclining gently, and an opposite side of the V-shaped cross section inclining sharply.

6. The optical fiber connector according to claim 1, wherein the tips of the optical fibers include end faces optically connected to each other and are formed by stress rupture.

7. An optical fiber connector for optically connecting at least one pair of optical fibers covered with covering members, comprising:
    a body formed of a material having a higher thermal deformation temperature than the covering members, the body including a guide hole configured to insert therein the optical fibers with tips thereof being positioned opposing each other, the body including fiber-fixing groove portions circumferentially formed in an inner wall of the body facing to the guide hole to fix the optical fibers together with the covering members; and
    crimping members fitted on ends of the body which are in an axial direction of the guide hole, the crimping members being configured to press the optical fibers from outside, and the crimping members having tapered inner surfaces,
    wherein when the covering members of the optical fibers are thermally deformed, parts of the covering members are bitten by the groove portions, fixing the optical fibers in the guide hole.

8. The optical fiber connector according to claim 7, wherein the body includes an adhesive injection hole configured to inject therethrough a transparent adhesive to clearance around the tips of the optical fibers.

9. The optical fiber connector according to claim 8, wherein the transparent adhesive is an refractive index matching agent with the refractive index of the optical fibers.

10. The optical fiber connector according to claim 7, wherein the groove portions have an inner diameter not less than an outer diameter of the covering members covering the optical fibers.

11. The optical fiber connector according to claim 7, wherein the groove portions include grooves each having a V-shaped cross section in an axial direction of the guide hole, one side of the V-shaped cross section located close to a center of the body inclining gently, and an opposite side of the V-shaped cross section inclining sharply.

12. The optical fiber connector according to claim 7, wherein the tips of the optical fibers include end faces optically connected to each other and formed by stress rupture.

13. A method for optically connecting at least one pair of optical fibers covered with covering members, comprising:
preparing an optical fiber connector including a body formed of a material having a higher thermal deformation temperature than the covering members, the body including a guide hole configured to insert therein the optical fibers with tips thereof being positioned opposing each other, the body including fiber-fixing groove portions circumferentially formed in an inner wall of the body facing to the guide hole to fix the optical fibers together with the covering members;
exposing end faces of the tips of the optical fibers;
inserting, into the guide hole of the optical fiber connector from opposite sides of the guide hole, the at least one pair of optical fibers with optical end faces of the tips of the optical fibers being faced each other;
fitting, after said inserting of the optical fibers, crimping members on the ends of the optical fiber connecter which are in an axial direction of the guide hole, and applying pressure to the optical fiber connecter in directions perpendicular and parallel to axes of the optical fibers to fix the optical fibers; and
heating the covering members covering the optical fibers when or after the optical fibers are inserted in the guide hole, to deform thermally the covering members and two bite parts of the covering members into the groove portions to fix the optical fibers in the guide hole.

14. The method according to claim 13, further comprising applying a transparent adhesive to clearance around the tips of the optical fibers and hardening the transparent adhesive, after fixing the optical fibers in the guide hole.

15. The method according to claim 13, wherein the crimping members have tapered inner surfaces.

16. A method for optically connecting at least one pair of optical fibers covered with covering members, comprising:
inserting, into a positioning guide hole of a ferrule from opposite sides of the guide hole, the at least one pair of optical fibers with optical end faces of the optical fibers opposing each other, wherein the optical end faces is exposed;
applying a pressing force to the optical end faces in an axial direction of the optical fibers;
heating the ferrule; and
applying pressure to the ferrule in directions perpendicular and parallel to axes of the optical fibers, using crimping members, to connect the end faces of the optical fibers.

17. The method according to claim 16, wherein the ferrule is heated to make a temperature of the covering members of the optical fibers higher than other portions.

18. The method according to claim 16, further comprising injecting a refractive-index-matching agent to clearance around the end faces of the optical fibers, after connecting the optical fibers.

19. The method according to claim 16, wherein the applying pressure to the ferrule in the direction parallel to the axes of the optical fibers includes applying pressure to the at least one pair of optical fibers covered by the covering members formed of one selected from the group consisting of UV cured resin, nonrigid plastic and polyamide resin.

20. The method according to claim 16, wherein the applying pressure to the ferrule in the direction perpendicular to the axes of the optical fibers includes applying pressure to a degree at which the covering members bite into uneven portions of the ferrule.

* * * * *